United States Patent [19]

Aspnes

[11] Patent Number: 4,492,466
[45] Date of Patent: Jan. 8, 1985

[54] CYLINDRICAL GRATING MONOCHROMATOR FOR SYNCHROTRON RADIATION

[75] Inventor: David E. Aspnes, Watchung, N.J.

[73] Assignee: AT&T Bell Laboratories, Murray Hill, N.J.

[21] Appl. No.: 393,078

[22] Filed: Jun. 28, 1982

[51] Int. Cl.³ .............................................. G01J 3/18
[52] U.S. Cl. .............................. 356/334; 350/162.21; 350/162.23
[58] Field of Search ................. 356/305, 328, 331–334; 350/162.17, 162.2, 162.21–162.23; 378/84, 85, 70, 71

[56] References Cited

U.S. PATENT DOCUMENTS

| | | | |
|---|---|---|---|
| 3,079,501 | 2/1963 | Birks, Jr. ............................ | 378/84 X |
| 3,242,335 | 3/1966 | Watanabe et al. ................. | 378/85 X |
| 4,429,411 | 1/1984 | Smither ................................. | 378/84 |

OTHER PUBLICATIONS

Gerasimov et al., *Optics and Spectroscopy*, vol. 28, No. 4, Apr. 1970, pp. 423–426.
R. P. Madden et al., "Two-Electron Excitation States in Helium," *Astrophysical Journal*, vol. 141, No. 2, 1965, pp. 364–375.
*Classical Electrodynamics*, J. D. Jackson, John Wiley & Sons, 1962, pp. 475–488.
M. R. Howells, "Vacuum Ultra Violet Monochromators," *Nuclear Instruments and Methods*, vol. 172, 1980, pp. 123–131.
D. E. Aspnes et al., "Common-Axis Rotationally Symmetric Anamorphic Mirror Combinations, etc.", *Journal of the Optical Society of America*, vol. 71, No. 8, Aug. 1981, pp. 997–1001.

Primary Examiner—F. L. Evans
Attorney, Agent, or Firm—Richard D. Laumann

[57] ABSTRACT

A tunable monochromator having variable groove spacing whereby each wavelength is diffracted to the same point and which is tuned by translating the grating parallel to a rotational symmetry axis is disclosed.

5 Claims, 3 Drawing Figures

CYLINDRICAL GRATING MONOCHROMATOR FOR SYNCHROTRON RADIATION

TECHNICAL FIELD

This invention relates generally to monochromators and particularly to cylindrical grating monochromators suitable for use with, for example, synchrotron radiation.

Background of the Invention

It has long been well known from classical electromagnetic theory that a charged and accelerated particle emits electromagnetic radiation. Such radiation is often disadvantageous when the charged particles traverse a circular or curved path in, for example, devices such as elementary particle accelerators or storage rings, because such radiation makes it more difficult to accelerate or maintain the particles to or at the desired energy.

However, this radiation, which is produced by the acceleration of charged particles, such as electrons, and is commonly called synchrotron radiation, has been successfully used in many scientific fields since it was first advantageously so used by the United States National Bureau of Standards in the 1960s. See, for example, *Astrophysical Journal*, 141, pp. 364–375, Feb. 15, 1965. In this article, Madden and Codling reported using 180 Mev electron synchrotron radiation to examine two electron excitation states in helium. In fact, the art has so progressed since publication of that article that storage rings have been and are now being built that are dedicated to non-nuclear and nonelementary particle physics applications, i.e., these storage rings are built solely for the production of synchrotron radiation.

Practical use of synchrotron radiation is not as simple a procedure as might be thought. The radiation from a charged particle subjected to an arbitrary acceleration is equivalent to that from a particle moving on an appropriate circular path and may be calculated from a classical electromagnetic theory. See, for example, *Classical Electrodynamics*, J. D. Jackson, John Wiley & Sons, (1962), pp. 475–488. For a relativistically moving particle, the radiation is emitted in a cone pointed in the direction of the particle's velocity vector and is strongly polarized in the plane of the particles's orbit. As the angle between the emitted radiation and the plane of the particle orbit becomes progressively larger, the emitted radiation becomes more circularly polarized. The radiation is not emitted at discrete frequencies but rather as a continuum up to a critical frequency with the amount of radiation emitted decreasing as the frequency increases. Synchrotron radiation sources may be designed to produced radiation at wavelengths as short as 5 Angstroms and electrons, rather than heavier charged particles, such as protons, are used because the intensity of the emitted radiation is inversely related to the mass of the accelerated particle. Thus, lighter particles yield radiation of greater intensity.

For many purposes, what is desired is not a continuum but rather radiation at a single well-defined wavelength. A monochromator is used to obtain such radiation from a synchrotron, and the structure of the monochromator will generally depend upon the wavelength of interest. For example, for wavelengths between 2000 and 3000 Angstroms, normal incidence grating monochromators are generally used. At shorter wavelengths, for example, between 20 and 400 Angstroms, grazing incidence monochromators are typically used. At wavelengths less than 5 Angstroms, crystal monochromators may be used. The wavelength region between 5 and 20 Angstroms may be covered either by grating or crystal monochromators.

The wavelength region presently of greatest interest to those working with synchrotron radiation is commonly termed the vacuum ultraviolet region, and it extends from approximately 10 Angstroms to approximately 1800 Angstroms. At wavelengths greater than 300 Angstroms, present technology can produce images with small aberrations and with few problems. However, at wavelengths less than 300 Angstroms, significant aberrations are generally present. Aberrations are generally undesirable because the resulting poor imaging may result in considerable loss of light. While standard grating designs generally meet some of the requirements, they do not, in general, satisfy all of the requirements with respect to image quality. The subject of vacuum ultraviolet monochromators is reviewed in detail in *Nuclear Instruments and Methods*, 172, pp. 121–131 (1980). The typical monochromator uses a grating which may be planar, spherical, or toroidal with grooves equally spaced along a chord. The wavelength selected by the monochromator is tuned by rotating the grating with respect to the incident radiation and thus changing the angles of the incident and diffracted beams with respect to the grating.

A basic problem with these gratings is that the focusing properties are determined geometrically by the curvature of the grating and the angles of incidence and diffraction. However, the angles change with tuning and the aberrations can be minimized and the focusing optimized at no more than a single wavelength. This wavelength corresponds to that for which the grating has rotational symmetry about the axis joining the source and exit slits. This can be understood by considering Fermat's Principle which states that light travels between two points along the shortest optical path. Fermat's Principle therefore implies that optical configurations having the highest degree of rotational symmetry, for example, about an axis between the source point and its conjugate image, will have the best imaging properties because they maximize the number of equivalent optical paths between object and image. Thus, spherical, elliptical, and toroidal gratings minimize aberrations only at the single wavelength which satisfies the rotational symmetry condition. The design of the grating is therefore a compromise between aberrations, resolution, wavelength range and speed, or illuminated area. Generally, compromises are made between different types of aberrations to widen the useful tuning range at the expense of achieving the optimum focusing condition at a single wavelength.

Summary of the Invention

I have found that a monochromator comprising a grating that is rotationally symmetric about an axis drawn between the entrance and the exit slits and having a variable groove spacing whereby diffraction into the exit slit occurs at the same wavelength for each ray has desirable characteristics. For example, the rotational symmetry insures that the out-of-plane focusing is exact. By making the groove spacing approximately exponential, diffraction focus and wavelength tuning are acheived by sliding the grating parallel to the rotational symmetry axis. Consequently, the grating geometry is invariant to the tuning operation and aberrations that arise in conventional designs are eliminated. The monochromator comprises a cylindrical section having approximately exponential groove spacing and entrance and exit slits. Although designed specifically for use with syncyhrotron radiation, the monochromator is useful at other wavelengths, for example, wavelengths in the visible light region.

DETAILED DESCRIPTION

Figure 1:
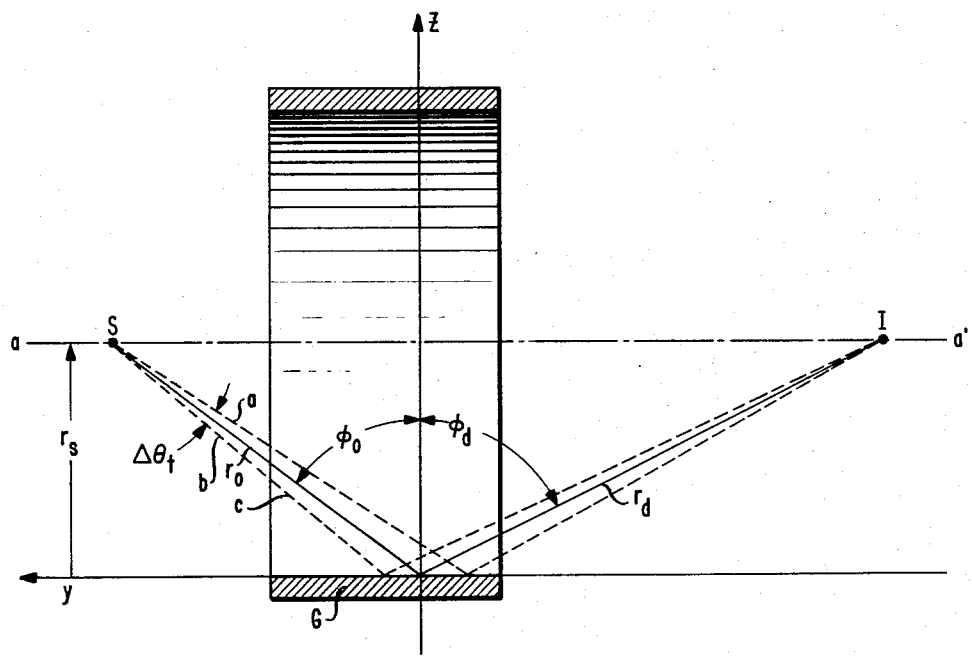
FIG. 1 is a schematic representation of a monochromator of this invention.

A monochromator of this invention is shown generally in cross section in FIG. 1. For reasons of clarity, the elements depicted are not drawn to scale. Depicted in FIG. 1 are a source, S, of radiation, a grating, G, and an image, I. The source, S, and image, I, are generally defined by entrance and exit slits. A sample (not shown) which is to be studied or processed and on which monochromatic radiation is incident will generally be placed just after the exit slit, or at the image of the exit slit provided by a post-focusing mirror (not shown). There may further be a detector (not shown) for the radiation reflected from the sample. The radiation source may be any source of electromagnetic radiation such as a synchrotron radiation source. The sample may be any crystal, semiconductor, etc., which, if desired, may be coated with a layer of, for example, resist which is sensitive to the radiation. The monochromator may further comprise means for moving the grating parallel to the symmetry axis. Such means are well known to those in the art and need not be described. The grating is fabricated by well-known and conventional techniques which need not be described in detail.

As can be seen from FIG. 1, the grating is cylindrically symmetric about the axis between the source and image, i.e., about the line drawn from a to a'. The surface of the grating is tangent to the y axis and the z axis is perpendicular to the surface of the grating. The grating is desirably a cylinder, i.e., the surface extends through 360 degrees, because such a configuration will maximize image intensity. However, a section of a cylinder may be used if desired. The distance from the symmetry axis to the grating surface is $r_s$, which is the sagittal radius of curvature. The angle of incidence, $\phi_o$ is defined as the angle between the principal ray emerging from the source and the line perpendicular to the grating at the point where the principal ray strikes the grating. The distance between the source and the above-mentioned intersection point is $r_o$. The angle of diffraction, $\phi_d$, is defined as the angle between the same perpendicular and the principal ray passing through the image. The distance between the intersection point and the image is $r_d$. It is to be understood that the radiation from the source is generally emitted within a cone. Three rays, a, b, and c, are illustrated which are incident on the grating at a, b, and c, respectively. These rays are all brought to a focus at I and define the tangential acceptance angle $\Delta\theta_t$. In this illustration, ray b is the principal ray.

The spacing between the grooves on the grating is variable as explained below. This permits radiation entering along rays a, b, or c to be brought into diffraction focus at the image I. This also permits the focusing wavelength to be varied by sliding the grating parallel to the rotational symmetry axis, that is, parallel to the y axis, without altering any of the geometrical relationships between the grating and the source and image. The major source of aberrations in the conventional designs is eliminated because the grating geometry is invariant to the wavelength tuning operation. It should be noted that the entire grating need not be exposed to the radiation but that new areas may be illuminated as the grating is translated.

To attain wavelength tuning, the groove spacing must be varied over the entire grating, that is, $d=d(y)$ where y is the coordinate parallel to the symmetry axis and d is the spacing between grooves. This has to be accomplished while maintaining simultaneously the in-plane focusing condition, that is, the relative variation of d(y) about $y=y_o$, the point of intersection of the principal ray in the coordinate system of the grating, for all $y_o$. That is, the series expansion of $d(y_o)$ should look like $d(y_o+y)=(d(y_o))(1+c_1y+c_2y^2+ \ldots)$ where $c_1$, $c_2$, ... are constants independent of $y_o$. This is simply a definition of the exponential function and therefore $d(y)=\exp(-ay)$ with a as a constant.

The following discussion may make this relationship between groove spacing clearer. Although a linear displacement does not affect the focusing properties in the out-of-plane or sagittal dimension, there is no guarantee that the new groove separation relation $d'(y)=d(y-y_1)$ resulting from a translation $(y_1-y_o)$ will also yield an exact diffraction focus of the source at I in the in-plane or tangential dimension at another wavelength $\lambda_1$. However, if $d'(y)=d(y-y_1)=d(y)f(y_1)$ with $f(0)=1$, the original condition is simply scaled so that an exact diffraction focus is obtained at the new wavelength $\lambda_1=\lambda(y_1)$. As previously discussed, this simply defines the function $d(y)=d_o\, e^{-ay}$ where $d_o$ is the separation between the grooves at $y_o$. In general, this is the point of intersection of the principal ray.

Exponentially spaced rulings cannot produce an exact tangential diffraction focus, but with the proper choice of design parameters, the diffraction errors are sufficiently small for typical acceptance angles for synchrotron radiation sources, and resolution is determined almost entirely by slit widths. Specifically, the incidence angle $\phi_o$, the diffraction angle $\phi_d$, and the grating constant a can be chosen to eliminate diffraction focusing errors to one higher order in y than is possible with geometric focusing by a toroidal grating with uniform rulings, even at the optimum wavelength of the toroidal element.

The diffraction condition for the right circular cylindrical grating is therefore $$n\lambda = d(y)(\sin \phi_d - \sin \phi_o) = d(y)\left\{ \frac{y - y_o}{r_o(y)} + \frac{y + y_d}{r_d(y)} \right\} \quad (1)$$

where $$r_o^2 = (y - y_o)^2 + r_s^2, \; r_d^2 = (y + y_d)^2 + r_s^2. \quad (2)$$

The object and image are located at $(y_o, r_s)$ and $(-y_d, r_s)$, respectivly. As can be seen, the grating may be made to choose the desired wavelength by appropriate selection of $d_o$ and $(\sin \phi_d - \sin \phi_o)$.

For an exact diffraction focus, the diffraction condition must be independent of y. The functional form of d(y) that results when this condition is imposed, i.e., $$d(y) = n\lambda \left[ \frac{y - y_o}{r_o(y)} + \frac{y + y_d}{r_d(y)} \right]^{-1}, \quad (3)$$

is not invariant to translations within a scaling factor, and resolution is a function of the grating position. However, invariance to the tuning operation is more important than diffraction focus at a single wavelength. Consequently, it is desirable to choose d(y) as given and then determine system parameters by eliminating as many terms as possible in a power series expansion in y. Then the only parameter that depends on the tuning motion is the scaling factor $d_o$. The first order term vanishes if $$r_s a = (\cos^3 \phi_d + \cos^3 \phi_o)/(\sin \phi_d - \sin \phi_o), \quad (4)$$

and the second order term vanishes if $$(\cos^3 \phi_d + \cos^3 \phi_o)^2 = 3(\sin \phi_d - \sin \phi_o)(\sin \phi_o \cos^4 \phi_o - \sin \phi_d \cos^4 \phi_o). \quad (5)$$

Figure 2:
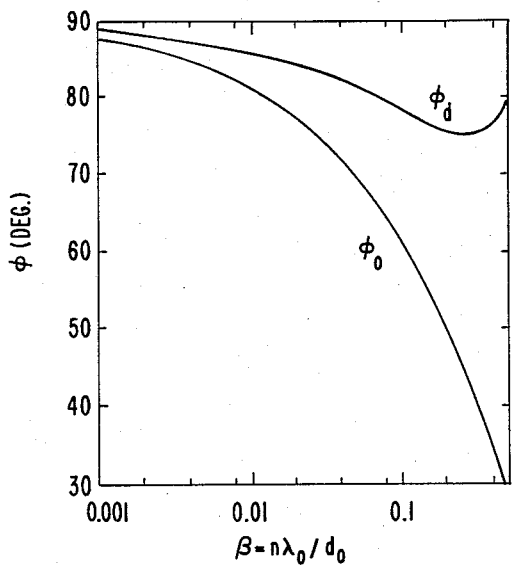
FIG. 2 shows the solutions of the diffraction equations for $\phi_o$ and $\phi_d$ as a function of order, wavelength, and groove spacing.

The simultaneous solutions to the equations for the diffraction condition and the vanishing of the second order term cannot be expressed in closed form. Rather, $\phi_o$ and $\phi_d$ are calculated numerically for a given diffraction order and wavelength/groove spacing ratio, i.e., $\lambda_o/d_o$. The results are conveniently expressed in terms of the dimensionless parameter $\beta = n\lambda_o/d_o$. It should be noted that while both $\lambda_o$ and $d_o$ change in the tuning operation, the ratio $\lambda_o/d_o$ does not change. Solutions for $\phi_o$ and $\phi_d$ are shown in FIG. 2 for the values of $\beta$ between 0.001 and approximately 0.5. The angle, $\phi_o$, is plotted vertically and $\beta$ is plotted horizontally. The angle of incidence tends automatically to grazing incidence as $\beta$ decreases and high intensities and efficiencies are obtained over the entire design range. The curves are for $n < 0$ and $\phi_d < \phi_o$. If $n < 0$, $\phi_o$ and $\phi_d$ are interchanged.

Figure 3:
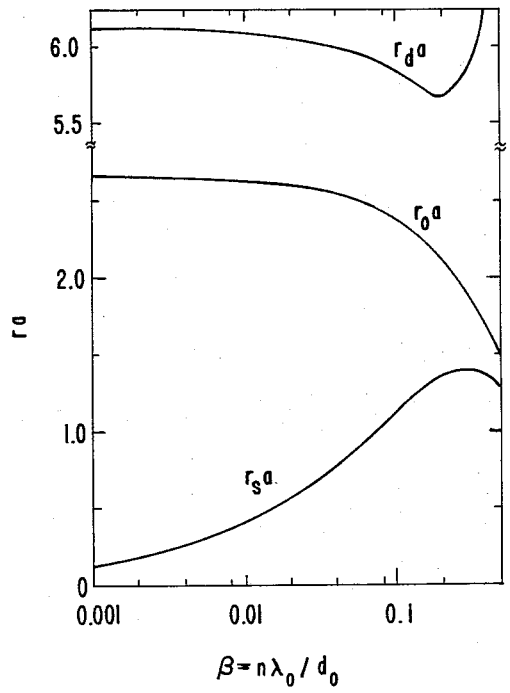
FIG. 3 shows the relative dimensions for the monochromator depicted in FIG. 1.

The relationships among $r_o$, $r_s$, $r_d$ and a are shown in FIG. 3 for outside orders, i.e., $n > 0$. For inside order, $r_o$ and $r_d$ are interchanged. The ratios of the three lengths depend only on $\beta$ and the scale of the instrument is determined by the grating constant, a.

Both horizontal and vertical acceptance angles are well matched to typical synchrotron radiation sources, even if modest image demagnifications are used to better match finite source sizes to entrance slits. For example, at $\beta = \frac{1}{3}$, the fourth-order term in the path length function changes sign, and the vanishing of this term leads to a cusp in the $\Delta\phi$ curves and to an unusually wide field for the instrument. At the cusp, both tangential and sagittal acceptance angles reach values of 260 and 400 mrad at resolutions of 0.0001 and 0.001, respectively. These angles correspond to f-numbers of 4.0 and 2.5, which are comparable to those of fast long-wavelength normal-incidence grating monochromators.

Aberrations and image distortions due to finite slit widths and source sizes may be considered. These may be conveniently investigated by numerically calculating the aberration patterns in the focal plane for a rectangular array of source points, $P_o$, in the object plane, i.e., by treating the diffracting element exactly as one would treat a standard reflection-focusing element. The object plane passes through S and is perpendicular to the principal ray $r_o$. Similarly, the image plane passes through I and is perpendicular to the principal ray $r_d$. The Gaussian images of the source points are defined by the image-plane intersections of the rays conjugate to those leaving the source points parallel to $r_o$. The aberration patterns are defined by the image-plane intersections of the rays conjugate to those leaving a given source point at a given inclination to the principal ray. A ray-tracing program such as that described in *Journal of the Optical Society of America*, 71, pp. 997–1001, 1981, may be used for such calculations.

As a specific example, consider a specific configuration designed for first-order operation in the 200–2000 Å (6–60 eV) spectral range. If the groove spacing is 300 to 3000 lines/mm ($0.333 \leq d \leq 3.333$ μm), this range is covered with $\beta = 0.06$. Assuming a grating constant of 10 m$^{-1}$, the curves in FIG. 3 show that $r_o = 0.250$ m, $r_s = 0.0934$ m, and $r_d = 0.595$ m. With this value of the grating constant, the tuning changes by a factor of e for a displacement of 10 cm, and a tuning range of 6 to 60 eV, and leads to an element length of approximately 30 cm. The sagittal acceptance angles are 150 and 215 mrad for intrinsic wavelength errors of $\pm 0.0001$ and $\pm 0.001$, respectively. The corresponding element widths required would be 3.8 and 5.4 cm if the source were capable of filling the angles. The grating monochromator is therefore an asymmetric single-element CGM whose entrance arm is $\frac{1}{4}$ m in length and whose exit or diffraction arm is somewhat over $\frac{1}{2}$ m in length.

The large tangential magnification is a consequence of asymmetric angles and arm lengths. If the source point S is displaced upwards in the object plane by an amount $\Delta z'_o$, it causes a reduction $\Delta\phi_o = -\Delta z'_o/r_o$ in $\phi_o$. According to the diffraction condition, the new diffraction focus is displaced by an amount $$\Delta z'_d = -\Delta \phi_d r_d = -(\cos \phi_o/\cos \phi_d)\Delta \phi_o r_d. \quad (6)$$

Taking the ratio of displacements yields the diffraction tangential magnification $$m_{td} = \frac{r_d \cos \phi_o}{r_o \cos \phi_d}. \quad (7)$$

The result is obviously general and applies to all focusing gratings, including spherical and toroidal elements as well as the cylindrical configuration discussed here.

The effect of varying the wavelength is understood by considering the diffraction condition which shows that the image of the point source $p_o$ will be displaced from the principal image point $p_d$ if the wavelength is changed. If the entrance slit opening is $z'_o$, this shift must be $m_s^2 z'_o$ for flux at that wavelength to be blocked if the exit slit opening is at its optimum value $z'_d = m_s^2 z'_o$. The full-width half-maximum (FWHM) resolution $\Delta\lambda/\lambda$ for a single cylindrical diffracting element is $$\frac{\Delta\lambda}{\lambda} = \frac{z'_o}{r_o} \frac{\cos\phi_o}{\sin\phi_d - \sin\phi_o}, \quad (8)$$

$$= \frac{z'_d}{r_d} \frac{\cos\phi_d}{\sin\phi_d - \sin\phi_o}.$$

Higher resolution can be obtained by decreasing the grating constant a and therefore generally increasing the monochromator dimensions from the 0.25-meter scale used in the above examples. However, the grating size increases proportionately. The cylindrical grating monochromator is basically a low- to moderate-resolution device best suited to applications where the need for maximum energy flux over a wide energy range is the primary consideration. The principal advantage is a wavelength-independent resolution that is better at all wavelengths than that of a toroidal grating monochromator at its optimum wavelength and is a consequence of using an exponentially-spaced ruling to perform diffraction focus and thereby allow a high-symmetry, tuning-independent geometry to be used.

Example: Use $\sin \phi_s - \sin \phi_o = 0.06$ and $a = 10$ cm, then if $\phi_s = 80.8$ degrees, $\phi_o = 67.99$ degrees, $y_o = 0.0945$ m, $x_o = 0.234$ m, $x_s = 0.584$ m, $r_o = 0.252$ m, and $r_s = 0.591$ m, then the image will always be focused and always on blaze.

Modifications of the embodiment specifically described are contemplated. For example, the image may be at infinity. The rays from the source will then exit from the monochromator essentially parallel to each other rather than being brought to a focus at I. However, this result is achieved with the loss of wavelength tuning. Furthermore, although described as having precise exponential groove spacing, the spacing in practice is approximately exponential.

What is claimed is:

1. A monochromator comprising a grating, said grating having a plurality of grooves with variable groove spacing, d, and entrance and exit slits, said grating being rotationally symmetric about an axis between said entrance slit and said exit slit whereby the diffraction into the exit slit occurs at the same wavelength for each ray incident on said grating from said entrance, said variable groove spacing is approximately of the form $d = d_o \exp(-ay)$ where $d_o$ is the separation between the grooves at $y_o$, a is a constant, and y is the coordinate parallel to said symmetry axis.

2. A monochromator as recited in claim 1 in which said grating comprises a cylinder.

3. A monochromator as recite in claim 2 in which $d_o$ is between approximately 0.3 $\mu$m and approximately 3.3 $\mu$m.

4. A monochromator as recited in claim 3 in which the distance of said cylinder from said axis is approximately 0.25 m.

5. A monochromator as recited in claim 1 in which said grating forms an image point and said exit slit is located at the image point.

* * * * *